(12) United States Patent
Zhong et al.

(10) Patent No.: US 8,670,073 B2
(45) Date of Patent: Mar. 11, 2014

(54) METHOD AND SYSTEM FOR VIDEO NOISE FILTERING

(75) Inventors: Sheng Zhong, San Jose, CA (US); Alexander MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 100 days.

(21) Appl. No.: 13/073,839

(22) Filed: Mar. 28, 2011

(65) Prior Publication Data

US 2012/0026402 A1  Feb. 2, 2012

Related U.S. Application Data

(60) Provisional application No. 61/370,035, filed on Aug. 2, 2010, provisional application No. 61/434,069, filed on Jan. 19, 2011.

(51) Int. Cl.
*H04N 5/21* (2006.01)
*H04N 9/64* (2006.01)
*G06K 9/40* (2006.01)

(52) U.S. Cl.
USPC ........... 348/607; 348/625; 348/441; 348/699; 348/701; 382/260

(58) Field of Classification Search
USPC ......... 348/607, 625, 627, 441, 452, 699, 701; 382/260
See application file for complete search history.

(56) References Cited

U.S. PATENT DOCUMENTS

| | | | | |
|---|---|---|---|---|
| 5,208,667 A * | 5/1993 | Saunders | | 348/452 |
| 5,642,170 A * | 6/1997 | Hackett et al. | | 348/459 |
| 5,661,525 A * | 8/1997 | Kovacevic et al. | | 348/452 |
| 5,784,114 A * | 7/1998 | Borer et al. | | 348/452 |
| 5,894,330 A * | 4/1999 | Huang et al. | | 348/447 |
| 5,943,099 A * | 8/1999 | Kim | | 348/448 |
| 5,959,681 A * | 9/1999 | Cho | | 348/452 |
| 6,141,056 A * | 10/2000 | Westerman | | 348/448 |
| 6,532,264 B1 * | 3/2003 | Kahn | | 375/240.16 |
| 6,678,330 B1 * | 1/2004 | Kondo et al. | | 375/240.24 |
| 7,454,083 B2 * | 11/2008 | Kondo et al. | | 382/275 |
| 7,570,309 B2 * | 8/2009 | Zhou et al. | | 348/701 |
| 8,059,207 B2 * | 11/2011 | Xu et al. | | 348/701 |
| 8,184,200 B1 * | 5/2012 | Biswas et al. | | 348/459 |
| 2005/0232356 A1 * | 10/2005 | Gomi et al. | | 375/240.16 |
| 2006/0232712 A1 * | 10/2006 | Zhou et al. | | 348/701 |
| 2006/0285596 A1 * | 12/2006 | Kondo et al. | | 375/240.16 |
| 2007/0014368 A1 * | 1/2007 | MacInnis et al. | | 375/240.24 |
| 2007/0014477 A1 * | 1/2007 | MacInnis et al. | | 382/236 |
| 2007/0070250 A1 * | 3/2007 | Zhou et al. | | 348/607 |

* cited by examiner

*Primary Examiner* — Brian Yenke
(74) *Attorney, Agent, or Firm* — Thomas | Horstemeyer, LLP

(57) ABSTRACT

A video processing device may compare a pixel or group of pixels of a current video picture to a pixel or group of pixels of a previous video picture. The video processing device may generate a motion vector for the pixel or group of pixels of the current video picture based on the comparison. The video processing device may determine an amount of filtering to be applied to the pixel or group of pixels of the current video picture. The video processing device may adjust the determined amount of filtering to be applied to the pixel or group of pixels based on the generated motion vector and based on a brightness value.

20 Claims, 7 Drawing Sheets

METHOD AND SYSTEM FOR VIDEO NOISE FILTERING

INCORPORATION BY REFERENCE

This patent application makes reference to, claims priority to and claims benefit from U.S. Provisional Patent Application Ser. No. 61/370,035 filed on Aug. 2, 2010 and U.S. Provisional Patent Application Ser. No. 61/434,069 filed on Jan. 19, 2011.

This patent application also makes reference to:
U.S. patent application Ser. No. 11/485,667 filed on Jul. 13, 2006;
U.S. patent application Ser. No. 11/486,331 filed on Jul. 13, 2006;
U.S. patent application Ser. No. 11/619,431 filed on Jan. 3, 2007;
U.S. patent application Ser. No. 11/619,444 filed on Jan. 3, 2007;
U.S. patent application Ser. No. 12/539,196 filed on Aug. 11, 2009;

Each of the above stated applications is hereby incorporated herein by reference in its entirety.

FIELD OF THE INVENTION

Certain embodiments of the invention relate to video processing. More specifically, certain embodiments of the invention relate to a method and system for video noise filtering.

BACKGROUND OF THE INVENTION

Analog video may be received through broadcast, cable, and VCRs. The reception is often corrupted by noise, and therefore to improve the visual quality, noise reduction may be needed. Digital video may be received through broadcast, cable, satellite, Internet, and video discs. Digital video may be corrupted by noise, which may include coding artifacts, and to improve the visual quality, noise reduction may be beneficial. Various noise filters have been utilized in video communication systems such as set top boxes and TVs. However, inaccurate noise characterization, especially during scenes with motion, may result in artifacts caused by the filtering, which are more visually detrimental than the original noise. In video system applications, random noise present in video signals, for example analog signals, may result in images that are less than visually pleasing to the viewer.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for video noise filtering, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for video noise filtering. In various embodiments of the invention, a video processing device may compare a pixel or group of pixels of a current video picture to a pixel or group of pixels of a previous video picture. The video processing device may generate a motion vector for the pixel or group of pixels of the current video picture based on the comparison. The video processing device may determine an amount of filtering to be applied to the pixel or group of pixels of the current video picture. The video processing device may adjust the determined amount of filtering to be applied to the pixel or group of pixels based, on the generated motion vector and based on a brightness value. The adjusting may comprise increasing the determined amount of filtering to be applied to the pixel or group of pixels of the current video picture when one or more components of the motion vector are below a threshold. The adjusting may comprise increasing the determined amount of filtering to be applied to the pixel or group of pixels of the current video picture when the brightness value associated with the pixel or group of pixels is below a threshold. The brightness value may be an average luminance of the pixel or group of pixels of the current video picture. The brightness value may be an average luminance of the pixel or group of pixels of the previous video picture. The determined amount of filtering to be applied to the pixel or group of pixels may be adjusted as a piecewise, linear, and/or non-linear function of the brightness value. The current video picture and the previous video picture may be video frames. The current video picture and the previous video picture may be video fields of the same parity. The video processing device may generate filter coefficients based on the determined amount of filtering to be applied to the pixel or group of pixels.

Figure 1:
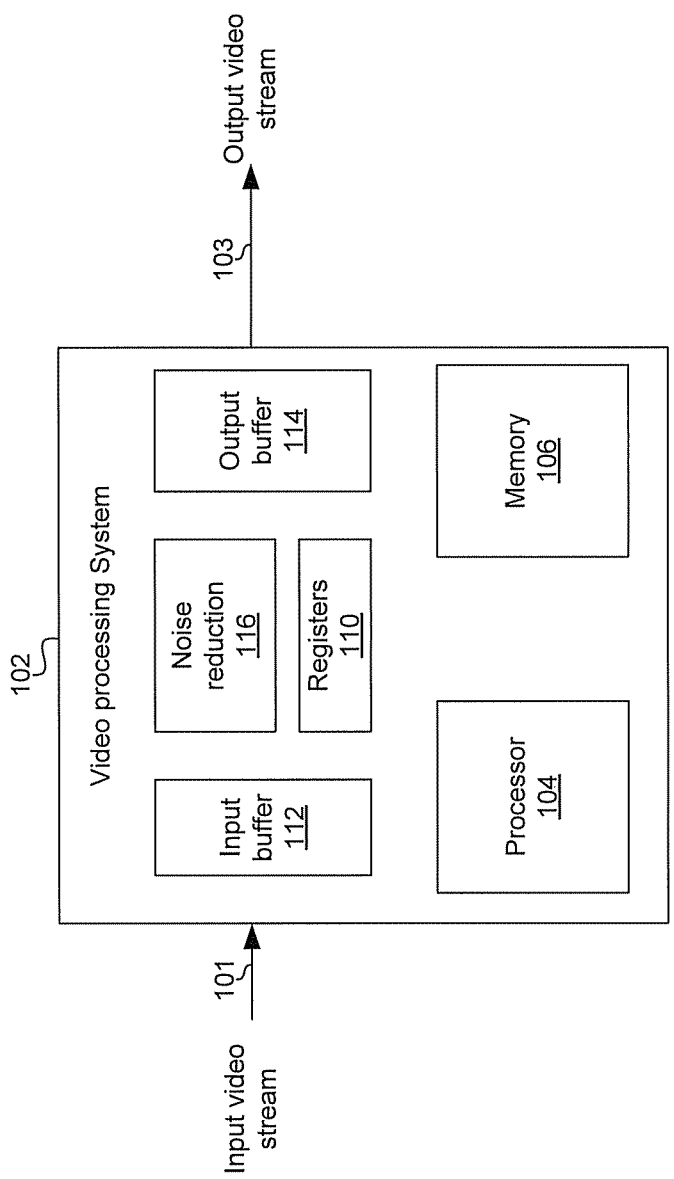
FIG. 1 is a block diagram of an exemplary video noise reduction system, in accordance with an embodiment of the invention.

FIG. 1 is a block diagram of an exemplary video noise reduction system, in accordance with an embodiment of the invention. Referring to FIG. 1, there is shown a video processing system 102, a processor 104, and a memory 106. The video processing system 102 may comprise registers 110 and noise reduction module 116. In some instances, the video processing system 102 may also comprise an input buffer 112 and/or an output buffer 114. The video processing system 102 may comprise suitable logic, circuitry, and/or code that may be operable to filter video to reduce visible noise.

The video processing system 102 may be operable to receive an input video stream 101 and, in some instances, to buffer' at least a portion of the received video stream 101 in the input buffer 112. In this regard, the input buffer 112 may comprise suitable logic, circuitry, and/or code that may be operable to store at least a portion of the received input video stream 101. Similarly, the video processing system 102 may be operable to generate a filtered output video stream 103 and, in some instances, to buffer at least a portion of the generated filtered output video stream 103 in the output buffer 114. In this regard, the output buffer 114 may comprise suitable logic, circuitry, and/or code that may be operable to store at least a portion of the filtered video output stream.

The noise reduction module 116 may comprise suitable logic, circuitry, interfaces, and/or code that may be operable to process the input video stream 101 to generate a corresponding output video stream 103 having reduced noise as compared to the input video stream 101. The noise reduction module 116 may comprise a first processing path which may utilize motion estimation for noise reduction and may comprise a second processing path which may utilize temporal filtering, without motion estimation, for noise reduction. The output video stream 103 may be generated from an output of the first path, an output of the second path, or a blend between the output of the first path and the output of the second path. An example of the first processing path is the MC path 322 described below with respect to FIG. 3. An example of the second path is the non-MC path 324 described below with respect to FIG. 3.

The processor 104 may comprise suitable logic, circuitry, and/or code that may be operable to process data and/or perform system control operations. The processor 104 may be operable to control at least a portion of the operations of the video processing system 102, for example, by executing one or more instructions stored in memory 106. Moreover, the processor 104 may be operable to program, update, and/or modify filter coefficients, threshold levels, and/or constants in at least a portion of the registers 110.

The memory 106 may comprise suitable logic, circuitry, and/or code that may be operable to store information that may be utilized by the video processing system 102 and/or the processor 104. The memory 106 may be operable to store filter coefficients, threshold levels, and/or constants, for example, to be utilized by the video processing system 102.

In operation, the video processing system 102 may receive the input video stream 101 and may filter noise in the input video stream to generate the output video stream 103. Operation of the video processing system 102 may be configured and/or controlled by the processor 104. The input video stream 101 may be processed via a first path which removes, reduces and/or otherwise mitigates noise based on an estimate of motion occurring between a previous video picture and a current video picture. The term video "picture" is utilized as described below with respect to FIG. 2. The input video stream 101 may also be processed via a second path which removes or reduces noise based on temporal filtering without motion estimation. The output of the first path and the output of the second path may each be weighted and the weighted outputs may be combined to generate the output video stream 103. In other words, the output stream 103 may be a blend between the output of the first path and the output of the second path. Possible weighting factors may comprise any number including zero, non-zero, fractional, and whole numbers.

Figure 2:
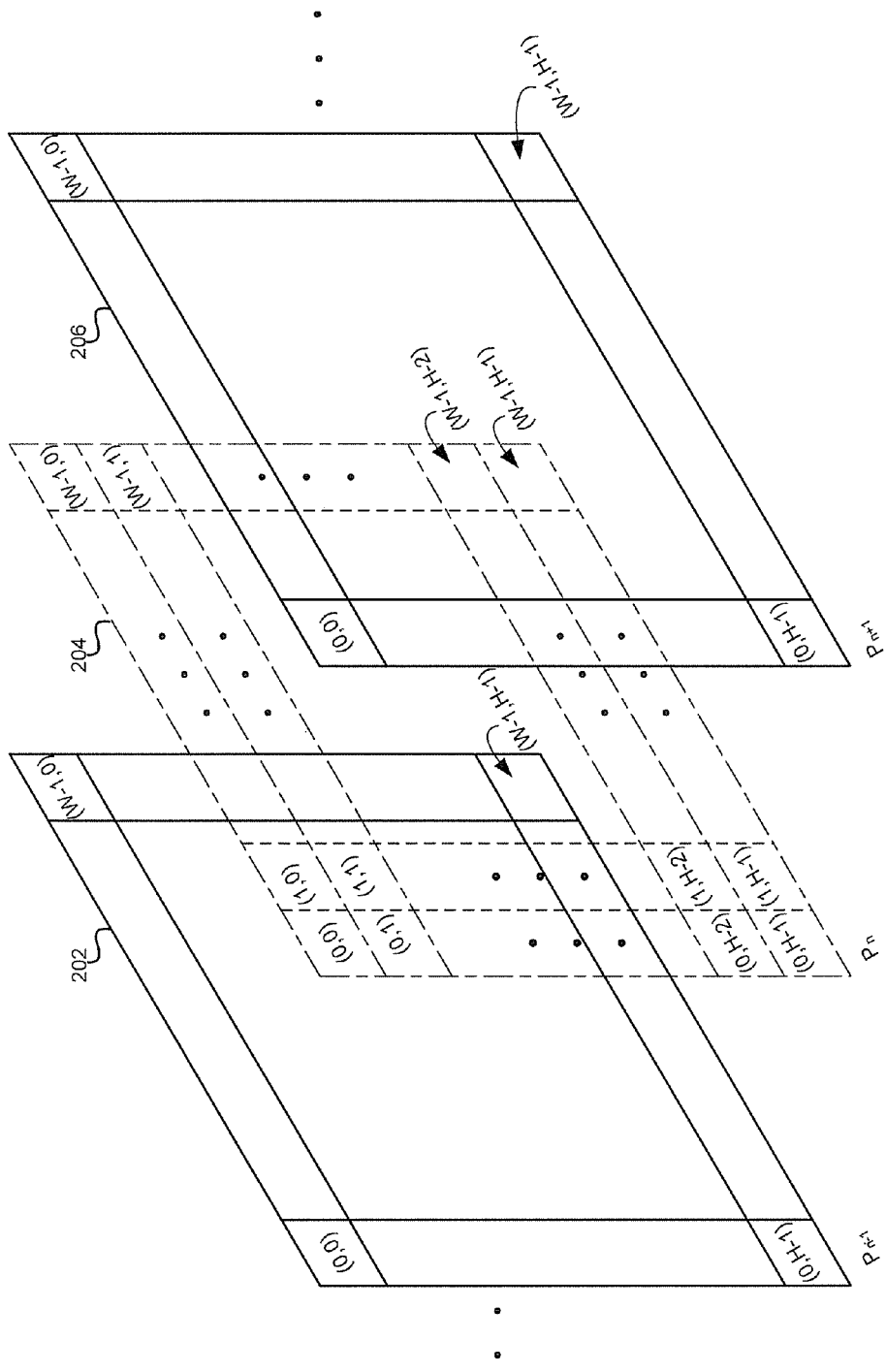
FIG. 2 is a diagram illustrating exemplary consecutive video pictures for noise reduction operations, in connection with an embodiment of the invention.

FIG. 2 is a diagram illustrating exemplary consecutive video pictures for noise reduction operations, in connection with an embodiment of the invention. Referring to FIG. 2, there is shown a current video picture 204, a previous video picture 202, and a next video picture 206. The current video picture 204 ("PICTURE$_{(N)}$") may correspond to a current picture being processed by the video processing system 102 in FIG. 1. The previous video picture 202 ("PICTURE$_{(N-1)}$") may correspond to a picture immediately preceding the current video picture 204. The next video picture 206 ("PICTURE$_{(N+1)}$") may correspond to a picture immediately following the current video picture 204. The previous video picture 202, the current video picture 204, and/or the next video picture 206 may be processed directly from the video input stream or after being buffered in the video processing system 102. The current video picture 204, the previous video picture 206, and the next video picture 208 may comprise luma (Y) and/or chroma (Cb, Cr) information. For interlaced input video streams, "picture" may be synonymous with "field." The previous video picture 202 may refer to the previous field of the same parity as the current video picture 204, and the next video picture 206 may refer to the next field of the same parity as the current video picture 204. The previous, current and next video fields of the same parity may be referred to as consecutive video pictures. For progressive scan input video streams, "picture" may be synonymous with "frame." The previous video picture 202 may refer to the video frame immediately preceding the current video picture 204, and the next video picture 206 may refer video frame immediately following the current video picture 204. The previous, current and next video frames may be referred to as consecutive video pictures.

Values of pixels in the previous video picture 202, in the current video picture 204, and in the next video picture 206 may be represented, respectively, as $P_{n-1}(x,y)$, $P_n(x,y)$, and $P_{n+1}(x,y)$, where P represents any of the components (e.g., Y, Cr, Cb) of a pixel. In an embodiment of the invention, as shown in FIG. 2, possible values of x may comprise 0, 1, . . . , W−1, and possible values of y may comprise 0, 1, . . . , H−1, where W is the picture width and H is the picture height. Pixels in different video pictures may be said to be collocated when they have the same x and y coordinates. For example, the top left pixels $P_{n-1}(0,0)$, $P_n(0,0)$, and $P_{n+1}(0,0)$ are collocated, and top right pixels $P_{n-1}(W-1,0)$, $P_n(W-1,0)$, and $P_{n+1}(W-1,0)$ are collocated.

Figure 3:
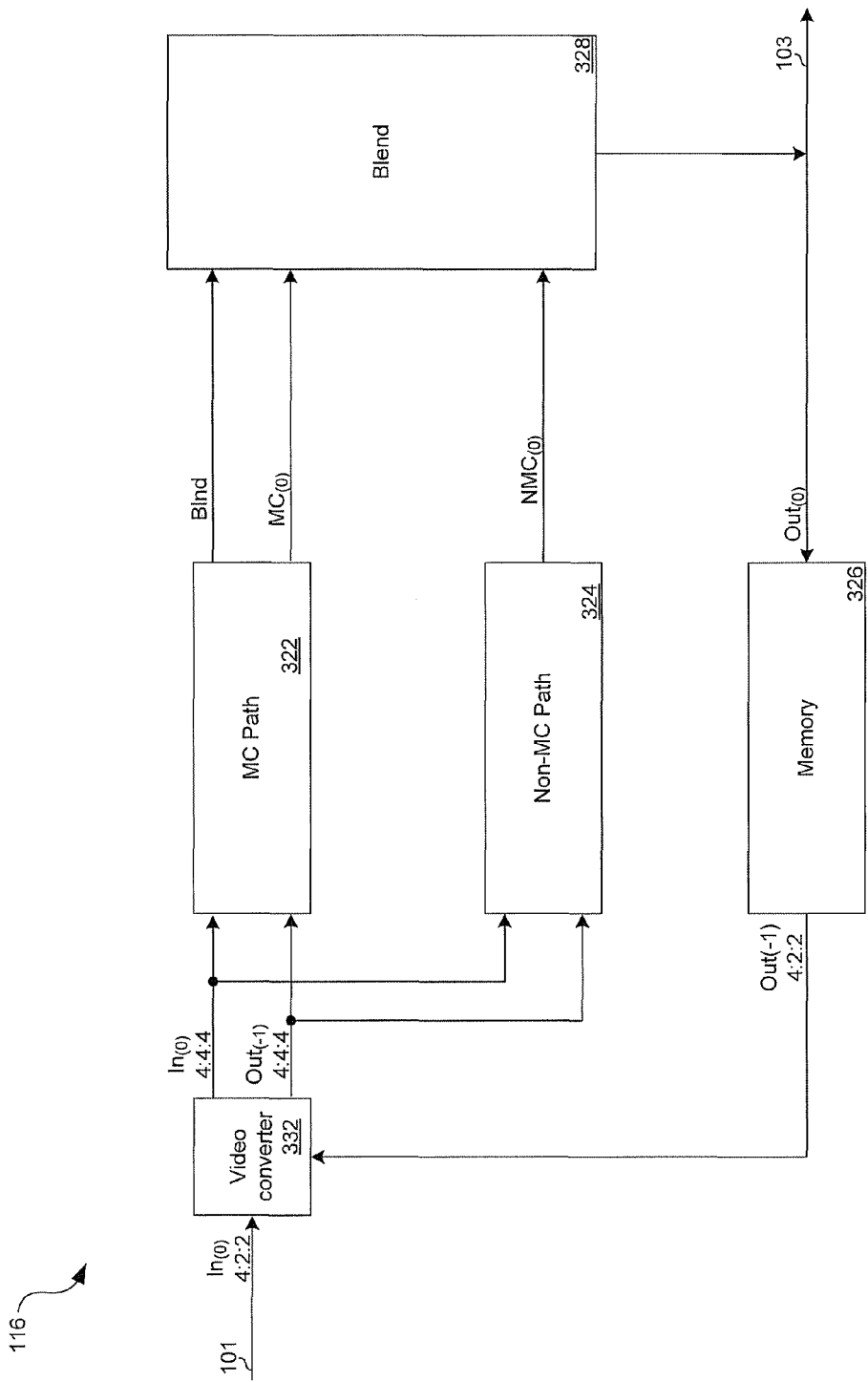
FIG. 3 is a block diagram illustrating an exemplary noise reduction module, in accordance with an embodiment of the invention.

FIG. 3 is a block diagram illustrating an exemplary noise reduction module, in accordance with an embodiment of the invention. Referring to FIG. 3, the noise reduction module may comprise a video converter 332, a motion compensated (MC) path 322, a non-MC path 324, a memory 326, and a blend block 328.

The picture Out$_{(-1)}$ may comprise the most-recent picture of the output video stream 103, that is, the most recent filtered picture output by the noise reduction module 116. The picture In$_{(0)}$ may comprise a picture currently being filtered by the video processing system 102. The picture Out$_{(0)}$ may comprise the filtered output picture currently being generated from In$_{(0)}$.

The video converter 332 may comprise suitable logic, circuitry and/or code that may be operable to receive video data from a video source in YCbCr 4:2:2 format, for example. The video converter 332 may be operable to convert the received video data to YCbCr in the 4:4:4 format before motion estimation and motion compensation operations are performed to facilitate motion estimation and motion compensation of chroma components. The chroma samples may be interpolated to the same sample density as the luma samples. The 4:2:2 to 4:4:4 interpolation may utilize a 4-tap filter, for example. The even indexed 4:4:4 chroma pixels may be generated from the half-value indexed 4:2:2 chroma samples. The odd indexed 4:4:4 chroma samples may be interpolated using four 4:2:2 chroma samples, for example, two to the left and two to the right of the current position.

The MC path 322 may comprise suitable logic, circuitry, and/or code that may be operable to perform motion estimation, motion compensation, and temporal filtering of the picture $In_{(0)}$ to output $MC_{(0)}$. An exemplary MC path 322 is described below with respect to FIG. 4.

The non-MC path 324 may comprise suitable logic, circuitry and/or code that may be operable to perform motion adaptive temporal filtering (MATF) of picture $In_{(0)}$ to output $NMC_{(0)}$. An exemplary non-MC path 324 is described below with respect to FIG. 6.

The memory 326 may comprise suitable logic, circuitry, and/or code that may be operable to store at least a portion of consecutive video pictures. In an embodiment of the invention, a current output $Out_{(0)}$ may be stored to memory and subsequently read out as the picture $Out_{(-1)}$.

The blend block 328 may comprise suitable logic, circuitry and/or code that may be operable to receive a filtered video picture ($MC_{(0)}$) from the MC path 322, a filtered video picture ($NMC_{(0)}$) from the non-MC path 324, and a blend control (Bind) from the MC path 322. The blend block may be operable to generate a current output picture $Out_{(0)}$ based on the following relationship:

$$Out_{(0)}=(BInd*MC_{(0)}+(2^B - BInd)*NMC_{(0)}+(2^B)/2)/2^B \quad \text{(Eq. 1)}$$

where B may be any suitable value, and Bind is a representation of the confidence that the motion vector calculated for a pixel accurately represents the motion of the pixel content and not noise. Bind is scaled to the range from 0 to $2^B$. In an exemplary embodiment of the invention, B may be equal to 8 and Bind may be scaled to the range from 0 to 256 with integer precision. In this regard, a value of 8 may generally be suitable for B, but the invention is not so limited to any particular value of B. An exemplary method for calculating Bind is described below with respect to FIG. 4.

Figure 4:
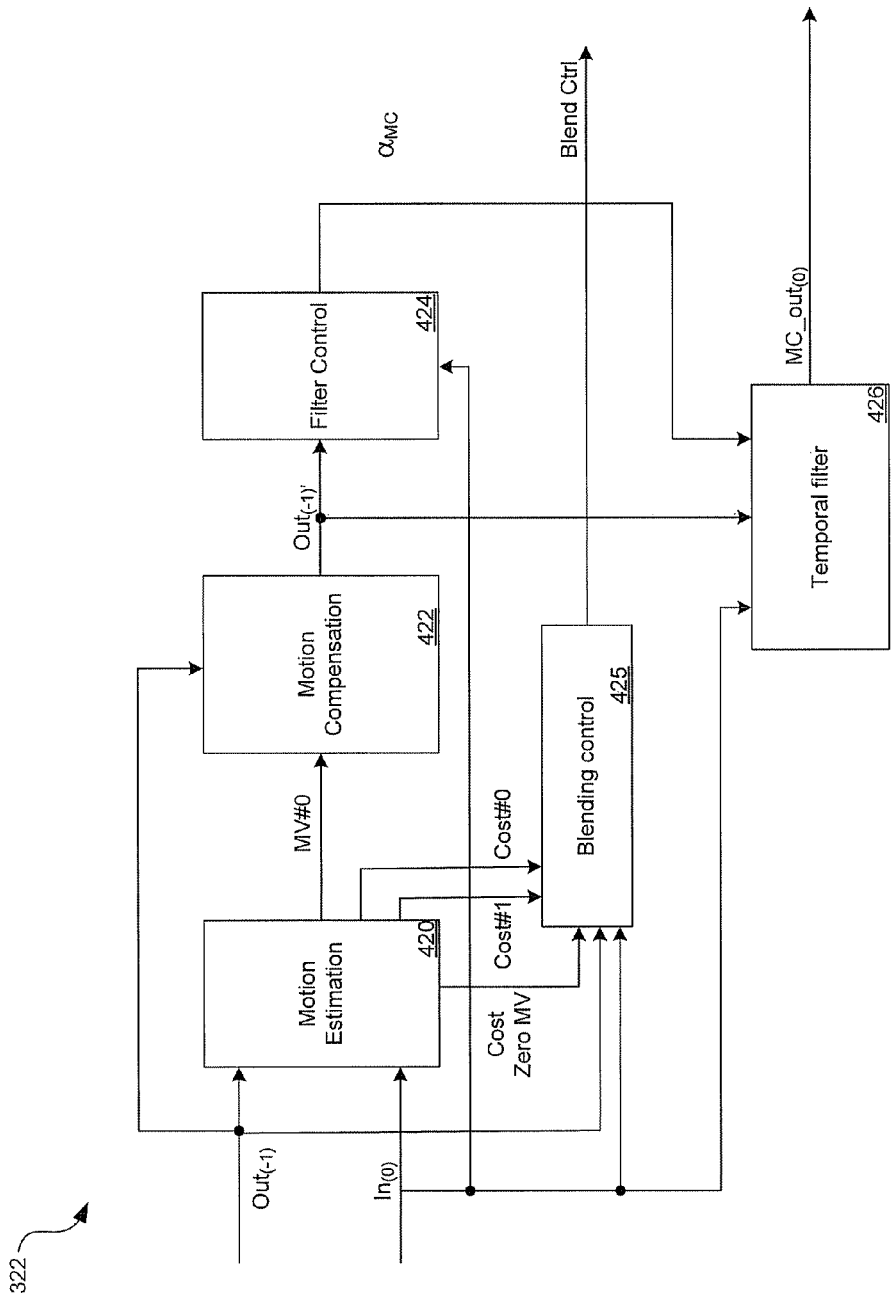
FIG. 4 is a block diagram of an exemplary MC path of a noise reduction module, in accordance with an embodiment of the invention.

FIG. 4 is a block diagram of an exemplary MC path of a noise reduction module, in accordance with an embodiment of the invention. Referring to FIG. 4, MC path 322 comprises a motion estimation block 420, a motion compensation block 422, a filter control block 424, an edge strength confidence and blending control block 425, and a temporal filter block 426.

The motion estimation (ME) block 420 may comprise suitable logic, circuitry and/or code that may be operable to calculate motion vectors MV#0 and MV#1 and associated costs cost#0 and cost#1. An exemplary method for calculating motion vectors and associated costs is described below with respect to FIG. 5.

The motion compensation (MC) block 422 may comprise suitable logic, circuitry and/or code that may utilize the calculated motion vectors and $Out_{(-1)}$ to generate pixels of motion compensated picture $Out'_{(-1)}$. Generation of the motion compensated picture $Out'_{(-1)}$ may comprise, in effect, shifting the pixel data of $Out_{(-1)}$ according to the motion vectors such that, ideally, the only differences between $Out'_{(-1)}$ and $In_{(0)}$ is noise.

The filter control block 424 may comprise suitable logic, circuitry, and/or code that may be operable to calculate filtering cost by comparing the motion compensated picture, $Out'_{(-1)}$, to $In_{(0)}$. The filtering cost may then be utilized to control filtering applied to the input video stream. In various embodiments of the invention, the higher the filtering cost, the less filtering that is applied. In this regard, higher filtering cost may correspond to a greater likelihood that filtering will introduce undesirable artifacts. An exemplary method for calculating filtering cost, $filter\_cost_{MC}$, is described below with respect to FIG. 5.

For a window of pixels having I columns and J rows, the filtering cost, $filter\_cost_{MC}$, may be mapped to filter coefficients of the temporal filter 426 utilizing the following exemplary equations:

$$\square_{MC}=K0*(1-K1/d^2) \quad \text{(Eq. 2a)}$$

$$d=16*filter\_cost_{MC}/(I*J) \quad \text{(Eq. 2b)}$$

where the value 16 may be changed and other values may be utilized accordingly, to facilitate fixed point operations. K0 and K1 are parameters that may be set according to the desired degree of filtering corresponding to the noise level of the input video and/or the expectations of a subsequent encoder.

The temporal filter 426 may comprise suitable logic, circuitry and/or code that may be operable to filter $In_{(0)}$ to generate filtered picture $MC_{(0)}$. The generated filtered picture $MC_{(0)}$ may then be conveyed to the blend block 328 (FIG. 3). The temporal filter 426 may be an IIR filter, for example. The output of the temporal filter 426 may, for example, be specified utilizing the following exemplary expression:

$$MC_{(0)}=((\square_{MC}*In_{(0)})+(2^B.-\square_{MC})*(Out'_{(-1)})+(2^B)/2)/2^B \quad \text{(Eq. 3)}$$

where B may be any suitable value, $Out'_{(-1)}$ is the output of the motion compensation block 422, $\square_{MC}$ is the output of the filter control block 424 and is scaled to the range from 0 to $2^B$. In an exemplary embodiment of the invention, B may be equal to 8 and $\square_{MC}$ may be scaled to the range from 0 to 256 with integer precision. In this regard, a value of 8 may generally be suitable for B, but the invention is not so limited to any particular value of B.

The blending calculation block 425 may comprise suitable logic, circuitry and/or code that may be operable to calculate Bind based on MV#0, cost#0, MV#1, cost#1, and cost_zeroMV received from the motion estimation block 420. In an embodiment of the invention, Bind may be calculated utilizing a combination of three metrics.

Figure 5:
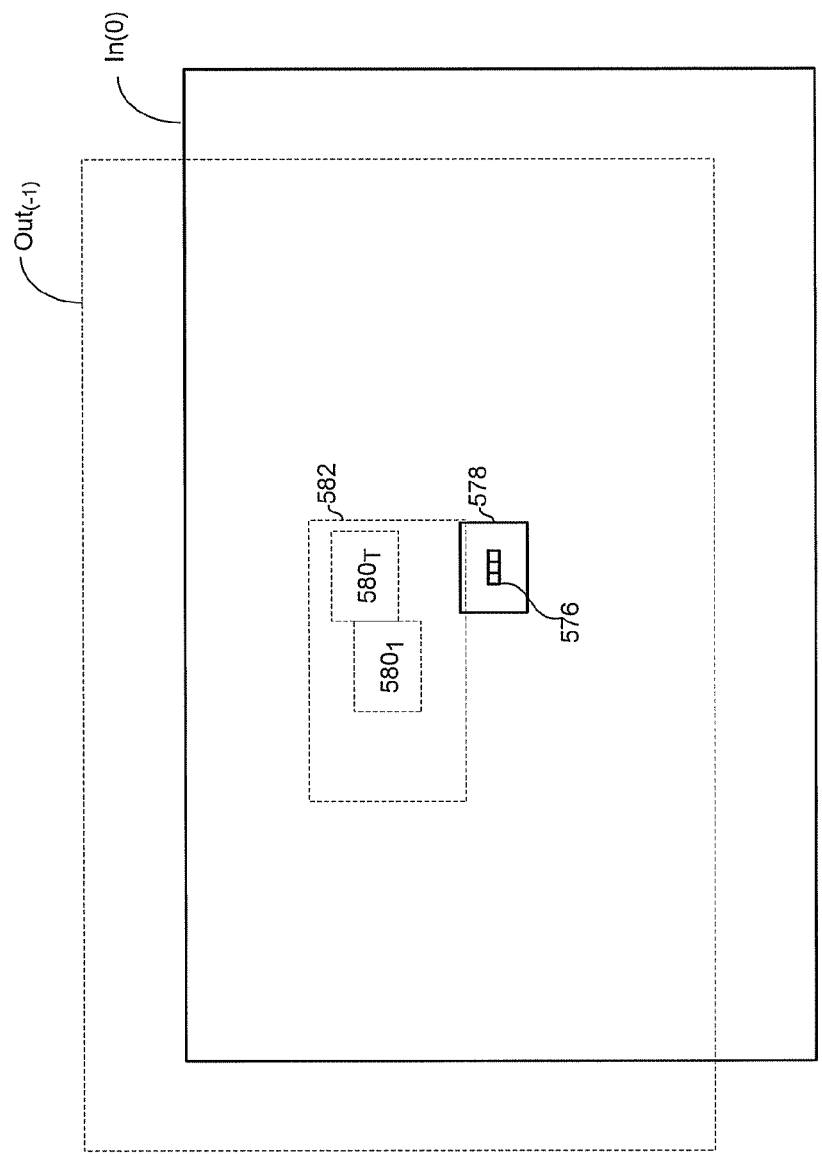
FIG. 5 is a block diagram illustrating the generation of motion vectors for performing motion compensation, in accordance with an embodiment of the invention.

Referring briefly to FIG. 5, a first metric (cost #1–cost #0), may indicate how much "better" MV#0 is than MV#1. In other words, for two different integers t1 and t2 each having a value between 1 and T, how much more similar to the window 578 is the window $580_{t1}$ associated with MV#0 than is the window $580_{t2}$ associated with MV#1.

Still referring to FIG. 5, a second metric (cost_zero_MV–cost_#0) may indicates how much better MV#0 is compared to the zero <0,0> motion vector. In other words, for an integer between 1 and T, how much more similar to the window 578 is the window $580_{t1}$ associated with MV#0 than is the window $580_1$ that is collocated with the window 578.

Returning to FIG. 4, third metric, edge_strength_adj, may also be calculated and utilized to adjust the blending control in order to reduce flickering that may occur near edges in $Out_{(0)}$. The edge strength calculations may be performed on the difference of the luma components of $In_{(0)}$ and $Out_{(-1)}$.

The vertical gradient or the horizontal edge strength may be calculated by applying a plurality of filter templates to a neighborhood of the luma component that may correspond to the difference between $In_{(0)}$ and the previous output picture $Out_{(-1)}$. The filter templates may be centered at the center pixel of a block of pixels (e.g. a 3×1 block. The gradient may be calculated once for pixel block. The first vertical template, Template 1, may be represented, for example, as follows:

$$\begin{pmatrix} 1 & 1 & 1 & 2 & 1 & 1 & 1 \\ -1 & -1 & -1 & -2 & -1 & -1 & -1 \\ 0 & 0 & 0 & 0 & 0 & 0 & 0 \end{pmatrix}$$

and the second vertical template, Template 2, may be represented, for example, as follows:

$$\begin{pmatrix} 0 & 0 & 0 & 0 & 0 & 0 & 0 \\ 1 & 1 & 1 & 2 & 1 & 1 & 1 \\ -1 & -1 & -1 & -2 & -1 & -1 & -1 \end{pmatrix}$$

The horizontal edge strength may be calculated, for example, as indicated utilizing the following expression:

$$h\_edge\_diff = \max(|temp1|, |temp2|)/2 \quad \text{(Eq. 4)}$$

where temp1 and temp2 are the output values generated by applying filter template 1 and filter template 2, respectively, to a neighborhood of the luma component of the difference between $In_{(0)}$ and $Out_{(-1)}$.

The horizontal gradient or the vertical edge strength may be calculated by applying the following two templates to the neighborhood of the luma difference between $In_{(0)}$ and $Out_{(-1)}$, centered at the center pixel of a block of pixels (e.g., a 3×1 block). The first horizontal template, Template 3, may be represented, for example, as follows:

$$\begin{pmatrix} 1 & 1 & -1 & -1 & 0 \\ 2 & 2 & -2 & -2 & 0 \\ 1 & 1 & -1 & -1 & 0 \end{pmatrix}$$

and the second horizontal template, Template 4, may be represented, for example, as follows:

$$\begin{pmatrix} 0 & 1 & 1 & -1 & -1 \\ 0 & 2 & 2 & -2 & -2 \\ 0 & 1 & 1 & -1 & -1 \end{pmatrix}$$

The vertical edge strength may be calculated for example, as indicated utilizing the following expression:

$$v\_edge\_diff = \max(|temp3|, |temp4|)/2 \quad \text{(Eq. 5)}$$

where temp3 and temp4 are the output values generated by applying filter template 3 and filter template 4, respectively. The final value of the edge strength that may be utilized to adjust the confidence level may be calculated, for example, utilizing the following expression:

$$edge\_strength\_adj = \max(0, h\_edge\_diff - v\_edge\_diff) \quad \text{(Eq. 6)}$$

The three metrics may be combined as indicated by the following expressions:

$$Confidence_{MV} = \max((cost\_zero_{\_MV\_cost\#}0), (cost\#1 - cost\#0)) \quad \text{(Eq. 7a)}$$

$$confidence = \max(0, confidence_{MV} - edge\_strength\_adj) \quad \text{(Eq. 7b)}$$

Confidence may then be processed through a non-linearity to generate Bind. In an embodiment of the invention, for a window of pixels having I columns and J rows, Bind may be calculated utilizing the following expressions:

$$Bind = K4*(1 - K5/d^2) \quad \text{(Eq. 8a)}$$

$$d = 16*confidence/(I*J) \quad \text{(Eq. 8b)}$$

where the value 16 may be changed and other values may be utilized accordingly, to facilitate fixed point operations. K4 and K5 are parameters that may be set according to the desired degree of filtering corresponding to the noise level of the input video and/or the expectations of a subsequent encoder.

FIG. 5 is a block diagram illustrating the generation of motion vectors for performing motion compensation, in accordance with an embodiment of the invention. Referring to FIG. 5, there is shown a most-recent output picture $Out_{(-1)}$, a current input picture $In(0)$, a search range 582, a window 578 in picture $In(0)$, a block of pixels 576 in window 578, and windows $580_t$ in picture $Out_{(-1)}$, where $1 \leq t \leq T$.

In operation, motion estimation may be performed between $In_{(0)}$ and $Out_{(-1)}$. One or more motion vectors may be determined. Each of the one or more motion vectors may describe the displacement of one or more pixels values in $In_{(0)}$ relative to a position of matching pixel values in $Out_{(-1)}$.

An exemplary method for determining a motion vector for pixel $(x_0, y_0)$ may comprise defining a window 578 in $In_{(0)}$ centered at the pixel $(x_0, y_0)$. A search may be performed by comparing the pixel values of the window 578 with a plurality of same-sized windows of pixels $580_t$ (of which two windows, $580_1$ and $580_T$, are shown) in $Out_{(-1)}$. The windows $580_1$-$580_T$ comprise all or a subset of the possible windows in search range 582. Window $580_1$ (i.e., t=1) may be centered at $(x_0, y_0)$ of the most-recent output picture Out(−1), and a center of each of windows $580_2$ (i.e., t=2) through $580_T$ (i.e., t=T) may be offset horizontally and/or vertically from $(x_0, y_0)$ by an integer and/or fractional amount. An offset from $(x_0, y_0)$ that is a fraction of a pixel may be achieved utilizing interpolation. For example, pixels horizontally offset from $x_0$ by ¼ pixel, ½ pixel, and ¾ pixel may be determined, respectively, according to the following expressions:

$$P(x_0 + \tfrac{1}{4}, y_0) = [3*P(x_0, y_0) + P(x_0 + 1, y_0) + 2]/4 \quad \text{(Eq. 9a)}$$

$$P(X_0 + \tfrac{1}{2}, y_0) = [P(x_0, y_0) + P(x_0 + 1, y_0) + 1]/2 \quad \text{(Eq. 9b)}$$

$$P(X_0 + \tfrac{3}{4}, y_0) = [P(x_0, y_0) + 3*P(x_0 + 1, y_0) + 2]/4, \quad \text{(Eq. 9c)}$$

where P represents any of the components (e.g, Y, Cr, Cb) of a pixel. Each of the windows $580_1$-$580_T$ may correspond to a potential motion vector for the pixel at $(x_0, y_0)$ of $In_{(0)}$. In this regard, for a window $580_t$, the motion vector may have the value of $<(x_t - x_0), (y_t - y_0)>$, where $(x_0, y_0)$ is the pixel at the center of window 578 and $(x_t, y_t)$ is the pixel at the center of the window $580_t$. Which of the potential motion vectors is chosen as the motion vector of the pixel at $(x_0, y_0)$ may be determined by calculating a cost value for each of the windows $580_t$ for $1 \leq t \leq T$. The cost value for a window $580_t$ may reflect how similar the window $580_t$ is to the window 578. One exemplary way in which such cost values may be calculated is to utilize a sum of absolute differences (SAD) for luma samples and a sum of signed differences (SSD) for chroma samples. For example, for a 7×5 window, a cost value may be calculated utilizing the following equations:

$$Luma\_SAD = \sum_{j+1}^{5} \sum_{i=1}^{7} |Luma_{580t}(i, j) - Luma_{578}(i, j)| \quad \text{(Eq. 10a)}$$

$$Cb\_SSD = \sum_{j+1}^{5} \sum_{i=1}^{7} Cb_{580t}(i, j) - Cb_{578}(i, j) \quad \text{(Eq. 10b)}$$

-continued $$Cr\_SSD = \sum_{j+1}^{5} \sum_{i=1}^{7} Cr_{580t}(i,j) - Cr_{578}(i,j) \quad \text{(Eq. 10c)}$$

$$filter\_cost_{MC} = \frac{(2*luma\_SAD + |Cb\_SSD| + |Cr\_SSD| + 2)}{4} \quad \text{(Eq. 10d)}$$

where (i,j) corresponds to the coordinate of a pixel in the windows 578 and 580, referenced from the top left pixel of the window, $luma_{578}(i,j)$ represents the luma component of the pixel at location (i,j) in the window 578, $luma_{580t}(i,j)$ represents the luma component of the pixel at location (i,j) in the window 580$_t$, $Cb_{578}(i,j)$ represents the blue chroma component of the pixel at location (i,j) in the window 578, $Cb_{580t}(i,j)$ represents the blue chroma component of the pixel at location (i,j) in the window 580$_t$, $Cr_{578}(i,j)$ represents the red chroma component of the pixel at location (i,j) in the window 578, and $Cr_{580t}(i,j)$ represents the red chroma component of the pixel at location (i,j) in the window 580$_t$.

In an embodiment of the invention, lower cost associated with a window 580$_t$ may reflect more similarity between that window 580$_t$ and the window 578. Moreover, higher similarity between the window 580$_t$ and the window 578 may equate to a higher likelihood that the pixels of window 578 in $In_{(0)}$ correspond to the pixels of window 580$_t$ in $Out_{(-1)}$.

For each block of pixels 576, a first motion vector, MV#0, may be the motion vector corresponding to the window 580$t$ having the lowest cost, and a second motion vector, MV#1, may be the motion vector corresponding to the window 580$t$ having the second lowest cost. The cost associated with MV#0 may be stored as cost#0 and the cost associated with MV#1 may be stored as cost#1. The cost of the <0,0> motion vector (i.e. the cost of the window 580$_1$ collocated with the window 578) may also be calculated and stored as cost_zeroMV.

Calculation of the motion vectors for the remaining pixels in $In_{(0)}$ may proceed as described for the pixel at $(x_0, y_0)$. However, in an embodiment of the invention, each calculated motion vector may be shared by a block of pixels 576 that includes pixels vertically and/or horizontally adjacent to the pixel for which the motion vector was calculated. The larger the block size, the fewer motion vectors that need to be calculated, thus reducing resources required for generating motion vectors. In an embodiment of the invention, a block size of 3×1 may be utilized. For example, the motion vector calculated for the pixel at $(x_0, y_0)$ may be shared by the pixels at $(x_0-1, y_0)$, $(x_0, y_0)$, and $(x_0+1, y_0)$ in the block 576. Although an exemplary block size of 3×1 is disclosed, the block size is not so limited. Accordingly, in various embodiments of the invention, the block 576 may be any size that does not exceed the size of the window 578.

Figure 6:
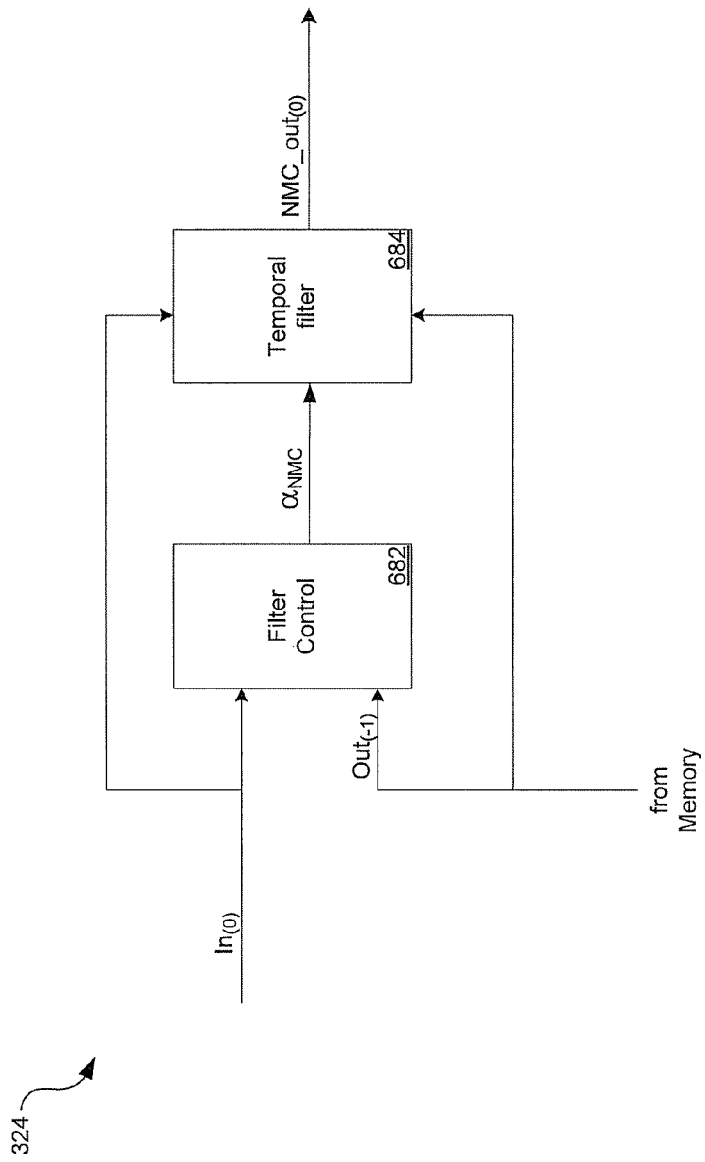
FIG. 6 is a block diagram of an exemplary non-MC path of a noise reduction module, in accordance with an embodiment of the invention.

FIG. 6 is a block diagram illustrating an exemplary non-MC path of a noise reduction, module, in accordance with an embodiment of the invention. Referring to FIG. 6, the non-MC path 324 may comprise a filter control block 682 and a temporal filter 684.

The filter control block 682 may function similarly to the filter control block 424 described with respect to FIG. 4. In this regard, the filter control block 682 may calculate a filtering cost, $filter\_cost_{NMC}$. The manner in which $filter\_cost_{NMC}$ is calculated may be similar to the manner in which $filter\_cost_{MC}$ is calculated, as described in equations 10a-10d. However, when calculating $filter\_cost_{NMC}$, rather than searching for the lowest cost window, $filter\_cost_{NMC}$ is only calculated for a single window 580$_t$ that is collocated with the window 578.

For a window of pixels having I columns and J rows, the filter control block 682 may map values of $filter\_cost_{NMC}$ to coefficients of the temporal filter 684 utilizing the following equations:

$$\square_{NMC} = K2*(1 - K3/d^2) \quad \text{(Eq. 11a)}$$

$$d = 16*filter\_cost_{NMC}/(I*J) \quad \text{(Eq. 11b)}$$

where the value 16 may be changed and other values may be utilized accordingly, to facilitate fixed point operations. K2 and K3 are parameters that may be set according to the desired degree of filtering corresponding to the noise level of the input video and/or the expectations of a subsequent encoder.

The temporal filter 684 may comprise suitable logic, circuitry and/or code that may be operable to filter $In_{(0)}$ to generate filtered picture $NMC_{(0)}$. $NMC_{(0)}$ may then be conveyed to the blend block 328 (FIG. 3). The temporal filter 684 may, for example, be an IIR filter. The output of the temporal filter 684 may, for example, be specified utilizing the following exemplary expression:

$$NMC_{(0)} = ((\square_{NMC}*In_{(0)}) + (2^B - \square_{NMC})*(Out_{(-1)}) + (2^B)/2)/2^B \quad \text{(Eq. 12)}$$

where B may be any suitable value, and $\square_{NMC}$ is the output of the filter control block 682 and is scaled to the range from 0 to $2^B$. In an embodiment of the invention, B may be equal to 8 and $\square_{NMC}$ may be scaled from 0 to 256 with integer precision. In this regard, a value of 8 may generally be suitable for B, but the invention is not so limited to any particular value of B.

In various embodiments of the invention, filter cost values may be adjusted in static or nearly static areas in which the luminance is dark enough. In an embodiment of the invention, the filter cost value may be reduced to allow more filtering in such areas. Static pixels may be pixels having a motion vectors below a threshold, that is, areas having motion vectors whose magnitude are below a programmable value. By increasing the filtering in such areas, the amount of noise may be reduced, thus improving the resulting image quality. In an embodiment of the invention, filter cost values may be adjusted as follows.

```
if(|MV#0_x| ≤ MV_static_thrshld_x && |MV#0_y| ≤
MV_static_thrshld_y)
{
    filter_cost_NMC = filter_cost_NMC * DarkFnct(brightness)      (Eq. 13)
    filter_cost_MC = filter_cost_MC * DarkFnct(brightness)
}
``` where MV#0_x is the x (horizontal) component of MV#0, MV#0_y is the y (vertical) component of the MV#0, MV_static_thrshld_x and MV_static_thrshld_y may be programmable and may be set to any suitable values, such as for example 0, 0.25, 0.5, 0.75, or 1.0.

The function DarkFnct may be any linear, non-linear, piecewise, or other function that provides a suitable result for decreasing the resulting value of $filter\_cost_{NMC}$ and $filter\_cost_{MC}$ when the brightness is low. In an embodiment of the invention, DarkFnct may be given by the following equation:

```
DarkFnct(brightness) =                                            (Eq. 14)
{
    0.5, if brightness ≤ dark_thrshld
    1.0, if brightness > dark_thrshld
}
```

In an embodiment of the invention, the function DarkFnct may be given by the following equation:

$$\text{DarkFnct(brightness)} = \begin{cases} \text{min\_fctr} + \text{brightness/dark\_thrshld} * (1 - \text{min\_fctr}), & \text{if brightness} \leq \text{dark\_thrshld} \\ 1.0, & \text{if brightness} > \text{dark\_thrshld} \end{cases} \quad \text{(Eq. 15)}$$

where min_fctr is any value $\geq 0$ and $<1$. An exemplary value of min_fctr is 0.5.

For any value of the function DarkFnct, the value of dark_thrshld may be programmable, and any suitable value may be selected. An example of a suitable value of dark_thrshld is 16, for 8 bit video systems, or 64, for 10 bit video systems.

In an exemplary embodiment, brightness may be computed as the larger of two averaged luminance values, a first averaged luminance value, $\text{Yavg\_In}_{(0)}$, generated from the current picture $\text{In}_{(0)}$, and a second averaged luminance value, $\text{Yavg\_Out}_{(-1)}$, generated from most-recent output picture Out(−1). Each of the average luminance values may be averaged over a window of I×J pixels. In an exemplary embodiment of the invention, I may be 5 and J may be 3. Brightness may be calculated utilizing the following exemplary equations.

$$\text{Yavg\_In}_{(0)} = \frac{1}{I*J}\sum_{j+1}^{J}\sum_{i=1}^{I}|Y_{In(0)}(i,j)| \quad \text{(Eq. 16a)}$$

$$\text{Yavg\_Out}_{(-1)} = \frac{1}{I*J}\sum_{j+1}^{J}\sum_{i=1}^{I}|Y_{Out(-1)}(i,j)| \quad \text{(Eq. 16b)}$$

$$\text{brightness} = \max(\text{Yavg\_In}_{(0)}, \text{Yavg\_Out}_{(-1)}); \quad \text{(Eq. 16c)}$$

where (i,j) corresponds to the coordinate, referenced from the top left pixel of the window, of a pixel in the windows being averaged; $\text{Yavg\_In}_{(0)}(i,j)$ represents the luma component of the pixel at location (i,j) in the window of In(0), and $\text{Yavg\_Out}_{(-1)}(i,j)$ represents the luma component of the pixel at location (i,j) in the window of Out(−1).

Figure 7:
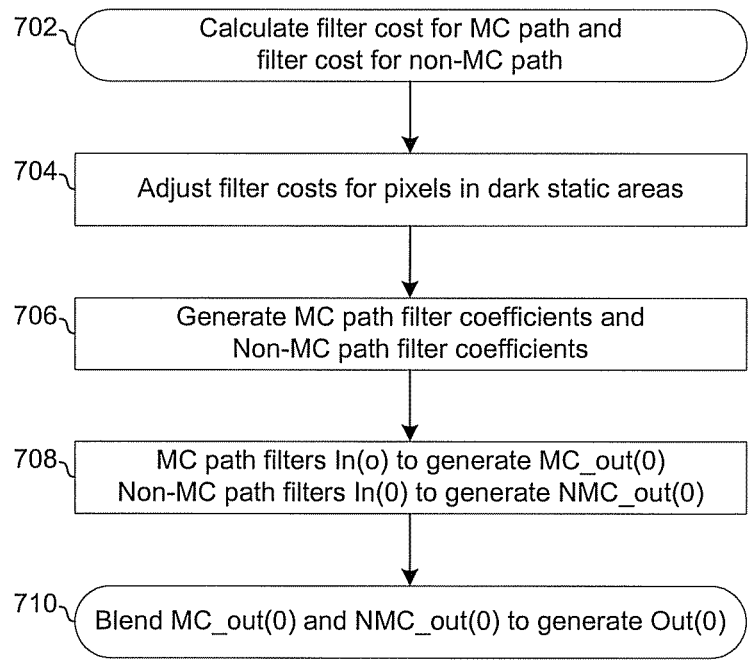
FIG. 7 is a flow chart illustrating exemplary steps for video noise reduction, in accordance with an embodiment of the invention.

FIG. 7 is a flow chart illustrating exemplary steps for video noise reduction, in accordance with an embodiment of the invention. Referring to FIG. 7, the exemplary steps may begin with step 702 when $\text{filter\_cost}_{MC}$ and $\text{filter\_cost}_{NMC}$ may be calculated. Calculation of $\text{filter\_cost}_{MC}$ may be performed as, for example, described by equations 10a-10d, and $\text{filter\_cost}_{NMC}$ may be calculated in a similar manner. In step 704, the value of $\text{filter\_cost}_{MC}$ and $\text{filter\_cost}_{NMC}$ may be adjusted for pixels in relatively dark and relatively static areas of the picture $\text{In}_{(0)}$. The adjustment may be, for example, as described in equations 13-16. In step 706, filter coefficients for the temporal filters 424 and 684 may be generated utilizing the adjusted values of $\text{filter\_cost}_{MC}$ and $\text{filter\_cost}_{NMC}$. In step 708, $\text{In}_{(0)}$ may be filtered by the temporal filters 426 and 684 to generate $\text{MC}_{(0)}$ and $\text{NMC}_{(0)}$. In step 710, the blend block 328 may blend $\text{MC}_{(0)}$ and $\text{NMC}_{(0)}$ to generate $\text{Out}_{(0)}$.

In an embodiment of the invention, a video processing device 102 may compare a pixel or group of pixels 578 of a current video picture $\text{In}_{(0)}$ to a pixel or group of pixels 580$_t$ of a previous video picture $\text{Out}_{(-1)}$. The video processing device 102 may generate a motion vector MV#0 for the pixel or group of pixels 578 of the current video picture $\text{In}_{(0)}$ based on the comparison. The video processing device 102 may determine an amount of filtering to be applied to the pixel or group of pixels 578 of the current video picture $\text{In}_{(0)}$. The video processing device 102 may adjust the determined amount of filtering to be applied to the pixel or group of pixels 578 based on the generated motion vector, MV#0, and based on a brightness value. The adjusting may comprise increasing the determined amount of filtering to be applied to the pixel or group of pixels 578 of the current video picture $\text{In}_{(0)}$ when a magnitude of one or more components of the motion vector MV#0 are below a threshold. The adjusting may comprise increasing the determined amount of filtering to be applied to the pixel or group of pixels of the current video picture when the brightness value associated with the pixel or group of pixels 578 is below a threshold, dark_thrshld. The brightness value may be an average luminance of the pixel or group of pixels 578 of the current video picture $\text{In}_{(0)}$. The brightness value may be an average luminance of the pixel or group of pixels 580$_t$ of the previous video picture $\text{Out}_{(-1)}$. The determined amount of filtering to be applied to the pixel or group of pixels may be adjusted as a piecewise, linear, or non-linear function of the brightness value. The current video picture $\text{In}_{(0)}$ and the previous video picture $\text{Out}_{(-1)}$ may be video frames. The current video picture $\text{In}_{(0)}$ and the previous video picture $\text{Out}_{(-1)}$ may be video fields of the same parity. The video processing device 102 may generate filter coefficients, such as $\square_{MC}$ and $\square_{NMC}$, based on the determined amount of filtering to be applied to the pixel or group of pixels 578.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for video noise filtering.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video noise filtering, comprising:
in a video processing device:
receiving, by a video converter, a pixel or group of pixels of a current video picture from a video source;
comparing said pixel or group of pixels of said current video picture to a pixel or group of pixels of a previous video picture;
generating a motion vector for said pixel or group of pixels of said current video picture based at least in part on said comparison;
determining an amount of filtering to be applied to said pixel or group of pixels of said current video picture based at least in part on a generated motion compensated filter cost and a non-motion compensated filter cost, wherein said generated motion compensated filter cost and said non-motion compensated filter cost are functions of a brightness value of said pixel or group of pixels if the brightness value of said pixel or group of pixels meets a predefined threshold;
adjusting said determined amount of filtering to be applied to said pixel or group of pixels based at least in part on said generated motion vector and based at least in part on a brightness value;
generating, using said pixel or group of pixels, a filtered motion compensated pixel or group of pixels and a filtered non-motion compensated pixel or group of pixels;
blending said filtered motion compensated pixel or group of pixels with said filtered non-motion compensated pixel or group of pixels to generate a filtered output pixel or group of pixels; and
storing said filtered output pixel or group of pixels in memory accessible by said video converter.

2. The method according to claim 1, wherein said adjusting comprising increasing said determined amount of filtering to be applied to said pixel or group of pixels of said current video picture when a magnitude of one or more components of said motion vector are below a threshold.

3. The method according to claim 1, wherein said adjusting comprises increasing said determined amount of filtering to be applied to said pixel or group of pixels of said current video picture when said brightness value associated with said pixel or group of pixels is below a threshold.

4. The method according to claim 1, wherein said brightness value is an average luminance of said pixel or group of pixels of said current video picture.

5. The method according to claim 1, wherein said brightness value is an average luminance of said pixel or group of pixels of said previous video picture.

6. The method according to claim 1, comprising adjusting said amount of filtering to be applied to said pixel or group of pixels as a piecewise function of said brightness value.

7. The method according to claim 1, comprising adjusting said amount of filtering to be applied to said pixel or group of pixels as a linear or non-linear function of said brightness value.

8. The method according to claim 1, wherein said current video picture and said previous video picture are video frames.

9. The method according to claim 1, wherein said current video picture and said previous video picture are video fields of a same parity.

10. A system for video noise filtering, comprising:
one or more circuits for use in a video processing device, said one or more circuits being operable to:
receive a pixel or group of pixels of a current video picture in a video converter from a video source;
compare said pixel or group of pixels of said current video picture to a pixel or group of pixels of a previous video picture;
generate a motion vector for said pixel or group of pixels of said current video picture based at least in part on said comparison;
determine an amount of filtering to be applied to said pixel or group of pixels of said current video picture based at least in part on a generated motion compensated filter cost and a non-motion compensated filter cost, wherein said generated motion compensated filter cost and said non-motion compensated filter cost are functions of a brightness value of said pixel or group of pixels if the brightness value of said pixel or group of pixels meets a predefined threshold;
adjust said determined amount of filtering to be applied to said pixel or group of pixels based at least in part on said generated motion vector and based on a brightness value;
generate, using said pixel or group of pixels, a filtered motion compensated pixel or group of pixels and a filtered non-motion compensated pixel or group of pixels;
blend said filtered motion compensated pixel or group of pixels with said filtered non-motion compensated pixel or group of pixels to generate a filtered output pixel or group of pixels; and
store said filtered output pixel or group of pixels in memory accessible by said video converter.

11. The system according to claim 10, wherein said adjusting comprises increasing said determined amount of filtering to be applied to said pixel or group of pixels of said current video picture when a magnitude of one or more components of said motion vector are below a threshold.

12. The system according to claim 10, wherein said adjusting comprises increasing said determined amount of filtering to be applied to said pixel or group of pixels of said current video picture when said brightness value associated with said pixel or group of pixels is below a threshold.

13. The system according to claim 10, wherein said brightness value is an average luminance of said pixel or group of pixels of said current video picture.

14. The system according to claim 10, wherein said brightness value is an average luminance of said pixel or group of pixels of said previous video picture.

15. The system according to claim 10, wherein said one or more circuits are operable to adjust said amount of filtering to be applied to said pixel or group of pixels as a piecewise function of said brightness value.

16. The system according to claim 10, wherein said one or more circuits are operable to adjust said amount of filtering to be applied to said pixel or group of pixels as a linear or non-linear function of said brightness value.

17. The system according to claim 10, wherein said current video picture and said previous video picture are video frames.

18. The system according to claim 10, wherein said current video picture and said previous video picture are video fields of a same parity.

19. The system according to claim 10, wherein said one or more circuits are operable to generate filter coefficients based on said determined amount of filtering to be applied to said pixel or group of pixels.

20. A non-transitory computer readable medium having a program for video noise filtering that, when executed by a processor, causes the processor to:
- receive a pixel or group of pixels of a current video picture in a video converter from a video source;
- compare said pixel or group of pixels of said current video picture to a pixel or group of pixels of a previous video picture;
- generate a motion vector for said pixel or group of pixels of said current video picture based at least in part on said comparison;
- determine an amount of filtering to be applied to said pixel or group of pixels of said current video picture based at least in part on a generated motion compensated filter cost and a non-motion compensated filter cost, wherein said generated motion compensated filter cost and said non-motion compensated filter cost are functions of a brightness value of said pixel or group of pixels if the brightness value of said pixel or group of pixels meets a predefined threshold;
- adjust said determined amount of filtering to be applied to said pixel or group of pixels based at least in part on said generated motion vector and based on a brightness value;
- generate, using said pixel or group of pixels, a filtered motion compensated pixel or group of pixels and a filtered non-motion compensated pixel or group of pixels;
- blend said filtered motion compensated pixel or group of pixels with said filtered non-motion compensated pixel or group of pixels to generate a filtered output pixel or group of pixels; and
- store said filtered output pixel or group of pixels in memory accessible by said video converter.

* * * * *